US012518131B2

(12) United States Patent
Jagolta et al.

(10) Patent No.: US 12,518,131 B2
(45) Date of Patent: Jan. 6, 2026

(54) DEEP LEARNING SYSTEM FOR DYNAMIC PREDICTION OF ORDER PREPARATION TIMES

(71) Applicant: Toast, Inc., Boston, MA (US)

(72) Inventors: Richard W. Jagolta, Gloucester, MA (US); Adam Dziki, Malden, MA (US); Seong Hyun Hwang, Cambridge, MA (US)

(73) Assignee: Toast, Inc., Boston, MA (US)

( * ) Notice: Subject to any disclaimer, the term of this patent is extended or adjusted under 35 U.S.C. 154(b) by 1119 days.

(21) Appl. No.: 17/245,324

(22) Filed: Apr. 30, 2021

(65) Prior Publication Data

US 2022/0351018 A1    Nov. 3, 2022

(51) Int. Cl.
*G06N 3/042* (2023.01)
*G06N 3/045* (2023.01)
*G06N 3/08* (2023.01)
*G06Q 20/20* (2012.01)
*G06Q 50/12* (2012.01)

(52) U.S. Cl.
CPC ............ *G06N 3/042* (2023.01); *G06N 3/045* (2023.01); *G06N 3/08* (2013.01); *G06Q 20/202* (2013.01); *G06Q 20/203* (2013.01); *G06Q 50/12* (2013.01)

(58) Field of Classification Search
CPC .......... G06N 3/042; G06N 3/045; G06N 3/08; G06N 3/0455; G06N 3/088; G06Q 20/202; G06Q 20/203; G06Q 50/12; G06Q 10/063; G06Q 10/0633; G06Q 10/08; G06Q 30/0633; G07G 1/14
See application file for complete search history.

(56) References Cited

U.S. PATENT DOCUMENTS 9,797,873 B1 * 10/2017 Feller ................ G01N 33/00
10,127,234 B1 * 11/2018 Krishnan ............. G06F 16/119
(Continued)

FOREIGN PATENT DOCUMENTS

JP    2020203075 A    12/2020

OTHER PUBLICATIONS

Hoi et al., "Prediction of Food Preparation Time for Smart City" (Year: 2020).*

(Continued)

*Primary Examiner* — Marshall L Werner
(74) *Attorney, Agent, or Firm* — Richard K. Huffman; Huffman Patent Group, LLC

(57) ABSTRACT

A method for predicting preparation times includes: retrieving set of item-level records from a database for preparation menu items for all subscriber restaurants; training and executing a first neural network to generate embeddings for each of the menu items; for a first subset of the set, calculating actual item-level preparation time vectors; for a second subset of the historical set, generating estimated item-level preparation time vectors; retrieving a set of order-level records for preparation of orders from the database; training a second neural network to predict the order-level preparation times, wherein inputs to the second neural network comprise one or more of the item-level preparation time vectors and metadata taken from the order-level records; and following training, executing the second neural network to generate predicted order-level preparation times for current orders within a restaurant.

20 Claims, 8 Drawing Sheets

(56) References Cited

U.S. PATENT DOCUMENTS

| | | | |
|---|---|---|---|
| 10,557,713 | B1 | 2/2020 | Yao et al. |
| 10,712,169 | B2 | 7/2020 | Droege et al. |
| 10,915,853 | B2 | 2/2021 | Berk et al. |
| 2019/0107404 | A1 | 4/2019 | Zhong et al. |
| 2019/0130260 | A1 | 5/2019 | Han et al. |
| 2019/0130350 | A1 | 5/2019 | Nguyen et al. |
| 2019/0171707 | A1* | 6/2019 | Rapaport ............ G06F 40/151 |
| 2019/0295124 | A1 | 9/2019 | Ramesh et al. |
| 2019/0370915 | A1 | 12/2019 | Garden et al. |
| 2021/0158323 | A1 | 5/2021 | Mimassi |

OTHER PUBLICATIONS

Wahab et al., "Implementation of Network-based Smart Order System" (Year: 2008).*

Zhu et al., "Order Fulfillment Cycle Time Estimation for On-Demand Food Delivery" (Year: 2020).*

Wahab et al., Implementation of Network-based Smart Order System, 2008. (Year: 2008).*

Hoi et al., Prediction of Food Preparation Time for Smart City, 2020 IEEE 22nd International Conference on High Performance Computing and Communications, Dec. 2020. (Year: 2020).*

Zhu et al., Order Fulfillment Cycle Time Estimation for On-Demand Food Delivery, KDD '20, Aug. 2020. (Year: 2020).*

Pal, Deepankar, The Deep Tech Behind Estimating Food Preparation Time, Feb. 2020. (Year: 2020).*

De Wynter, Adrian. "A Version of the BERT Language Model that's 20 Times as Fast." Downloaded from https://www.amazon.science/blog/a-version-of-the-bert-language-model-that's-20-times-as-fast. Dec. 3, 2020. pp. 1-13.

Zhu, Lin et al. "Order Fulfillment Cycle Time Estimation for On-Demand Food Delivery." Applied Data Science Track Paper. KDD '20. Aug. 23-27, 2020. Virtual Event, USA. Association for Computing Machinery. pp. 2571-2580.

* cited by examiner

FIG. 5 METHOD FOR DYNAMIC ORDER PREPARATION TIMES PREDICTION

EXEMPLARY GUEST DEVICE DISPLAY

DEEP LEARNING SYSTEM FOR DYNAMIC PREDICTION OF ORDER PREPARATION TIMES

CROSS-REFERENCE TO RELATED APPLICATIONS

This application is related to the following co-pending U.S. Patent Application, which has a common assignee and common inventors, the entirety of which is herein incorporated by reference.

| SERIAL NUMBER | FILING DATE | TITLE |
|---|---|---|
| (TST.0183) | — | APPARATUS AND METHOD FOR DYNAMIC PREDICTION AND UPDATE OF TAKEOUT TIMES |

BACKGROUND OF THE INVENTION

Field of the Invention

This invention relates in general to the field of retail establishment operations, and more particularly to methods and systems for improved prediction of order preparation times.

Description of the Related Art

It is rare these days to walk into a restaurant that has a manually operated cash register along with manual (i.e., paper and pencil) order entry. Rather, it is more common to find one or more electronic point-of-sale (POS) terminals through which a guest may order food items from a menu. Whether the terminals are employed in a fixed position or hand carried by wait staff, the advantages over prior manual entry mechanisms are pronounced and include more accurate presentation of menu items, accurate and up to date pricing, customized loyalty presentations, automated transmission of orders for fulfillment, and automated payment processing. Not only do these POS terminals allow guests to place food orders within the restaurant itself, but these systems further enable guests to place orders using devices outside of the restaurant, where the orders can be placed for dine-in, takeout, delivery by restaurant personnel, or delivery by $3^{rd}$-party delivery services such as GrubHub and DoorDash.

As one skilled in the art will appreciate, a guest's dining experience, whether dine-in, takeout, or delivery, hinges upon the quality of the food itself, and the quality of a food order is often determined by timing factors associated with its preparation for the guest. More specifically, orders that take too long to prepare test a diner's patience, particularly if the diner is waiting for a pickup order, but also if they are forced to sit at their table or in a pickup waiting area for a long period of time. Likewise, food orders that are ready prior to a predicted pickup or delivery time often arrive at their destination cold, which is equally annoying. As one skilled in the art will also appreciate, restaurants and delivery services go to great lengths to ensure that orders are prepared on time. But in addition to ensuring timely preparation of orders, restaurants and delivery services are equally focused on providing accurate order preparation/ready/pickup times to their guests. As one skilled in the art will further appreciate, order delivery times provided by delivery services depend primarily on the order preparation times provided to them by restaurants preparing their orders for pickup and delivery to guests.

Accordingly, restaurants employ a number of techniques to predict order preparation times, all of which are crude estimates, and which vary significantly as a function of internal restaurant conditions and external factors. One technique essentially adds a set interval, say 30 minutes, to order placement time. That is, an order placed at 7:00 PM is predicted to be ready by 7:30 PM. Another technique counts orders in the restaurant's kitchen, where a set time, say 30 minutes, is assigned for preparation and if the number of orders in the kitchen exceeds a threshold, say 10 orders, an additional amount of preparation time, say 15 minutes, is added for orders over the count. Thus, orders exceeding the count are predicted to be ready in 45 minutes rather than 30 minutes. A third technique employs a subjective "snooze" button (physical or virtual) that is activated by kitchen management when kitchen conditions change such that order preparation time predictions are being missed. When the snooze is activated, all order preparation times are pushed out an additional period of time.

It is no wonder, then, that diners, especially those placing takeout and delivery orders, are exasperated at the inaccurate pickup and delivery time estimates that are provided by restaurants and delivery services, and even more so during recent pandemic times, when virtually all restaurants convert over to takeout- and delivery-only dining options.

Therefore, what is needed are methods and systems that enable restaurants to predict order preparation times more accurately than that which has heretofore been provided.

What is also needed are apparatus and methods that enable restaurants to provide timely updates to order preparation times when conditions, both internal and external, warrant.

What is further needed are techniques for accurately predicting pickup times for takeout orders that utilize historical menu item-level preparation times for each item within the takeout orders.

SUMMARY OF THE INVENTION

The present invention, among other applications, is directed to solving the above-noted problems and addresses other problems, disadvantages, and limitations of the prior art by providing a superior technique for accurately, and dynamically predicting preparation times for orders placed in a restaurant. In one embodiment, a computer-implemented method for predicting order-level preparation times is provided, the method comprising: retrieving a historical set of item-level preparation time records from a database for preparation of all menu items corresponding to all restaurants participating in a point-of-sale (POS) subscriber system; training and executing a first deep learning neural network to generate item-level embeddings for each of the menu items; for a first subset of the historical set, calculating actual item-level preparation time vectors based on their corresponding historical item-level preparation time records; for a second subset of the historical set, generating estimated item-level preparation time vectors based on historical item-level preparation time records for pluralities of menu items within the first subset, where each of the pluralities of menu items in the first subset comprise highest ranked item-level embeddings in the first subset that exhibit cosine similarities to corresponding item-level embeddings in the second subset; retrieving a historical set of order-level preparation time records for preparation of orders from the database that corresponds to all restaurants participating in a point-of-sale (POS) subscriber system; training a second deep learning neural network to predict the order-level preparation times, wherein inputs to the second deep learning neural network comprise one or more of the item-level preparation time vectors that correspond to menu items within each of the orders and metadata taken from the order-level preparation time records that corresponds to the each of the orders; and following training, executing the second deep learning neural network to generate predicted order-level preparation times for current orders within a restaurant, wherein inputs to the second deep learning neural network comprise one or more of the item-level preparation time vectors that correspond to menu items within each of the current orders and metadata taken provided by one or more kitchen fulfillment terminals within the restaurant.

One aspect of the present invention contemplates a computer-readable storage medium storing instructions that, when executed by a computer, cause the computer to perform a method for predicting order-level preparation times, the method comprising: retrieving a historical set of item-level preparation time records from a database for preparation of all menu items corresponding to all restaurants participating in a point-of-sale (POS) subscriber system; training and executing a first deep learning neural network to generate item-level embeddings for each of the menu items; for a first subset of the historical set, calculating actual item-level preparation time vectors based on their corresponding historical item-level preparation time records; for a second subset of the historical set, generating estimated item-level preparation time vectors based on historical item-level preparation time records for pluralities of menu items within the first subset, where each of the pluralities of menu items in the first subset comprise highest ranked item-level embeddings in the first subset that exhibit cosine similarities to corresponding item-level embeddings in the second subset; retrieving a historical set of order-level preparation time records for preparation of orders from the database that corresponds to all restaurants participating in a point-of-sale (POS) subscriber system; training a second deep learning neural network to predict the order-level preparation times, wherein inputs to the second deep learning neural network comprise one or more of the item-level preparation time vectors that correspond to menu items within each of the orders and metadata taken from the order-level preparation time records that corresponds to the each of the orders; and following training, executing the second deep learning neural network to generate predicted order-level preparation times for current orders within a restaurant, wherein inputs to the second deep learning neural network comprise one or more of the item-level preparation time vectors that correspond to menu items within each of the current orders and metadata taken provided by one or more kitchen fulfillment terminals within the restaurant.

Another aspect of the present invention comprehends a computer program product for predicting order-level preparation times, the computer program product comprising: a computer readable non-transitory medium having computer readable program code stored thereon, the computer readable program code comprising: program instructions to retrieve a historical set of item-level preparation time records from a database for preparation of all menu items corresponding to all restaurants participating in a point-of-sale (POS) subscriber system; program instructions to train and execute a first deep learning neural network to generate item-level embeddings for each of the menu items; program instructions to, for a first subset of the historical set, calculate actual item-level preparation time vectors based on their corresponding historical item-level preparation time records; program instructions to, for a second subset of the historical set, generate estimated item-level preparation time vectors based on historical item-level preparation time records for pluralities of menu items within the first subset, where each of the pluralities of menu items in the first subset comprise highest ranked item-level embeddings in the first subset that exhibit cosine similarities to corresponding item-level embeddings in the second subset; program instructions to retrieve a historical set of order-level preparation time records for preparation of orders from the database that corresponds to all restaurants participating in a point-of-sale (POS) subscriber system; program instructions to train a second deep learning neural network to predict the order-level preparation times, wherein inputs to the second deep learning neural network comprise one or more of the item-level preparation time vectors that correspond to menu items within each of the orders and metadata taken from the order-level preparation time records that corresponds to the each of the orders; and program instructions to, following training, execute the second deep learning neural network to generate predicted order-level preparation times for current orders within a restaurant, wherein inputs to the second deep learning neural network comprise one or more of the item-level preparation time vectors that correspond to menu items within each of the current orders and metadata taken provided by one or more kitchen fulfillment terminals within the restaurant.

BRIEF DESCRIPTION OF THE DRAWINGS

These and other objects, features, and advantages of the present invention will become better understood with regard to the following description, and accompanying drawings where.

DETAILED DESCRIPTION

Figure 1:
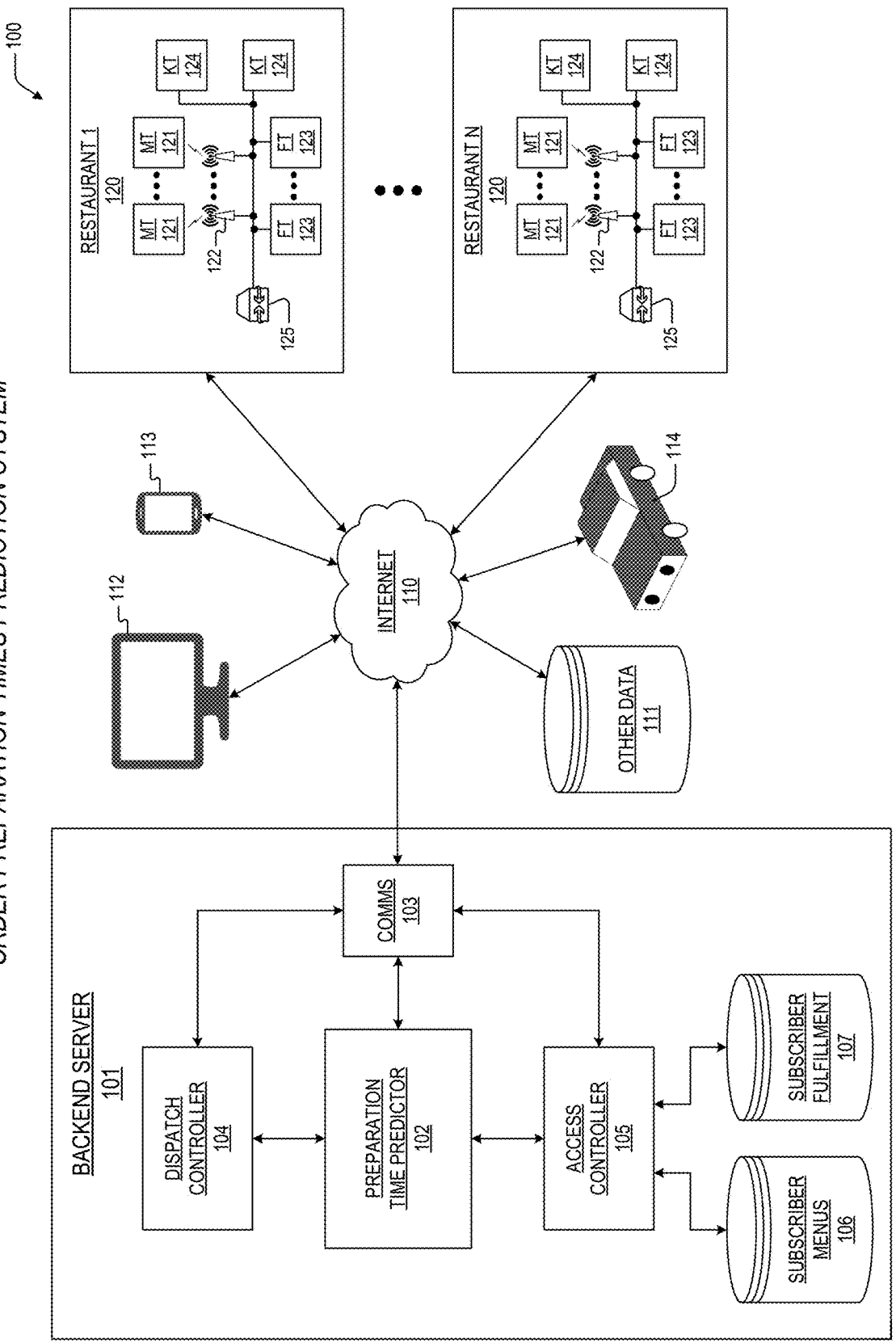
FIG. 1 is a block diagram illustrating an order preparation times prediction system according to the present invention.

Exemplary and illustrative embodiments of the invention are described below. It should be understood at the outset that although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application," "application," "application program," "app," "computer program," or "program") by performing operations on data, where the operations may include arithmetic operations, logical operations, or input/output operations. A CPU may also be referred to as a "processor."

Module: As used herein, the term "module" may refer to, be part of, or include an application specific integrated circuit (ASIC), an electronic circuit, a processor (shared, dedicated, or group) and/or memory (shared, dedicated, or group) that execute one or more computer programs, a combinational logic circuit, and/or other suitable components that provide the described functionality.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

x86-Compatible Microprocessor: A microprocessor capable of executing computer applications that are programmed according to the x86 ISA.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Internet: The Internet (also referred to as the world wide web or internet cloud) is a global wide area network connecting computers throughout the world via a plurality of high-bandwidth data links which are collectively known as the Internet backbone. The Internet backbone may be coupled to Internet hubs that route data to other locations, such as web servers and Internet Service Providers (ISPs). The ISPs route data between individual computers and the Internet and may employ a variety of links to couple to the individual computers including, but not limited to, cable, DSL, fiber, and Wi-Fi to enable the individual computers to transmit and receive data over in the form of email, web page services, social media, etc. The Internet may also be referred to as the world-wide web or merely the web.

In view of the above background discussion on retail establishment operations and associated techniques employed by present day restaurants and delivery services for estimating food order preparation times, a discussion of the present invention will now be presented with reference to FIGS. 1-8.

Turning to FIG. 1, a block diagram is presented illustrating an order preparation times prediction system 100 according to the present invention. The system 100 may include a plurality of restaurants 120 that each subscribe to a restaurant point-of-sale subscription service for automation of restaurant point-of-sale (POS) services including, but not limited to, displaying of menus, ordering and upsell of menu items by guests, routing of ordered items to kitchen staff for preparation, sequencing of ordering items through kitchens, capture and historical tracking of metadata corresponding to each order (e.g., staff assigned for preparation of ordered items; day, date, time, and season; kitchen conditions; short-term kitchen work load; true time for preparation of ordered items; dining option for order (e.g., takeout, dine in); pending incoming orders; local weather; and significant events, internal or external, that may impact order preparation times), acceptance of payments by guests and processing of those payments through corresponding credit card networks and financial institutions, and payment of charged amounts to the restaurants themselves. In one embodiment, the system 100 according to the present invention may comprise over 30,000 restaurants 120 of different types and levels of service that fulfill over 50,000,000 orders every month.

The restaurants 120 are coupled via the internet 110 to a backend server 101, that is not on-premises with the restaurants 120. The restaurants 120 do not include any type of device that functions as a local server to perform the operations noted above, but rather couple to the internet 110 through one or more internet gateway devices 125. The restaurants 120 may comprise one or more wireless access points 122 that are hard-wired to the gateway 125 and that provide for wireless communications over one or more wireless networks that include, but are not limited to, Wi-Fi networks, Bluetooth networks, near-field communication (NFC) networks, infrared networks, IEEE 802.15.4 networks, Zigbee radio networks, cellular communication networks (e.g., 3G, 4G, LTE, 5G, etc.), and ad hoc networks with other devices such as a smart phones that may be on-premises. The restaurants 120 may further comprise one or more mobile POS terminals 121 that are coupled to one or more of the wireless access points 122 and that may be employed for seating, tableside ordering, and guest payments. The restaurants 120 may additionally include one or more fixed POS terminals 123 that are hard-wired to the gateway 125 over a hard-wired communication network such as, but not limited to, Ethernet networks, local area networks, and etc. The mobile POS terminals 121 and fixed POS terminals 123 may be individually configured to comport with intended function (e.g., guest seating, order entry, order fulfillment, payment processing, owner engagement, order feedback, etc.), or they may be configured similarly.

The restaurants 120 may moreover comprise one or more kitchen fulfillment terminals 124 that are typically hard-wired to the gateway 125, though the present invention contemplates wireless connections to the one or more kitchen fulfillment terminals 125 via wireless access points 122.

The backend server 101 many comprise communications circuits 103 that are coupled to the internet 110 and to a preparation time predictor 102, a database access controller 105, and a dispatch controller 104. The preparation time predictor 102 is coupled to the dispatch controller 104 and the access controller 105. The access controller 105 is couple to a subscriber menus database 106 and a subscriber fulfillment database 107. The backend server 101 is also operationally couple to one or more other databases 111, one or more guest laptop/desktop computers 112, one or more guest smart devices 113 (e.g., smart phone or tablet), and one or more delivery services 114.

In operation, the mobile POS terminals 121, fixed POS terminals 123, and kitchen fulfillment terminals 124 in each of the restaurants 120 communicate with the backend server 101 through their respective gateways 125 to perform the functions of displaying of menus, ordering of menu items by guests, upselling of menu items by guests, routing of ordered items to kitchen staff for preparation, sequencing of ordering items through kitchens, capture and historical tracking of metadata corresponding to each order, acceptance of payments by guests and processing of those payments through corresponding credit card networks and financial institutions, and payment of charged amounts to the restaurants themselves, thus providing for efficient operation of the restaurants 120. One or more of the mobile POS terminals 121 and fixed POS terminals 123 within a given restaurant may be employed to enter and take payment for portions of an individual order within the restaurant, where synchronization of order states is performed by the backend server 101 and synchronized states of all orders within the given restaurant 120 is transmitted by the backend server 101 to all POS terminals 121, 123 within the given restaurant 120.

For each order placed within the given restaurant 120, the backend server 101 may transmit messages over the internet 110 to one or more of the given restaurant's kitchen fulfillment terminals 124 to efficiently accomplish preparation of individual items within an order and to provide for order sequencing and coursing. For example, the backend server may route messages to a first kitchen fulfillment terminal 124 for preparation of salad courses, a second kitchen fulfillment terminal 124 for preparation of meat items, a third kitchen fulfillment terminal 124 for preparation of sides, and a fourth kitchen fulfillment terminal 124 that functions as an expediter terminal 124 for all orders within the restaurant 124. In addition to performing these noted functions, the kitchen fulfillment terminals 124 according to the present invention also capture and transmit metadata corresponding to each of the orders placed and fulfilled within a given restaurant 120. As noted above, this metadata includes, but is not limited to, actual order preparation time; actual preparation time for items within an order; staff assigned for preparation of ordered items; day, date, time, and season corresponding to the order; kitchen conditions during preparation of the order; short-term kitchen work load during preparation of the order; dining option for the order (e.g., takeout, dine in, delivery); pending incoming orders; local weather; and significant events, internal or external, that may impact preparation of the order (e.g., arrival of 40 guests in a single reservation at order placement time, end of concert or sporting event nearby, etc.). All of the metadata corresponding to orders are transmitted to the backend server 101 over the internet 110 and the backend server 101 directs the access controller 105 to store the metadata in the subscriber fulfillment database 107, where it is associated with the restaurant 120 that entered and fulfilled the order. Accordingly, the subscriber fulfillment database 107 may comprise historical ground truth fulfillment data and metadata corresponding to all orders that are fulfilled by each of the subscriber restaurants.

The subscriber menus database 106 comprises all of the menu items that are employed by each of the subscriber restaurants 106. In one embodiment, the subscriber menus database 106 and the subscriber fulfillment database 107 may be separate databases 106, 107. Another embodiment contemplates combination of this data into a single subscriber database. An additional embodiment contemplates databases 106, 107 that are not on-premises with the backend server 101, but which are accessed via communications over the internet 110, such as those provided by Amazon Web Services.

The other data database 111 may be accessed by the backend server 101 to retrieve items of metadata that are not captured by the kitchen fulfillment terminals 124 such as local weather and external events.

In one embodiment, guests may employ one of the one or more laptop or desktop computers 112 to place orders with a given restaurant 120 and are provided with a predicted order preparation time or pickup time by the backend server 101 as will be described in more detail below. Likewise, guests may employ one of the one or more smart devices 113 to place orders with a given restaurant 120 and are provided with a predicted order preparation time or pickup time by the backend server 101 as will be described in more detail below. In one embodiment, the laptop/desktop computers 112 and smart devices 113 may be executing proprietary thin client application programs that execute to display menus, provide for order entry and predicted preparation times, and that provide for payment and feedback. Another embodiment contemplates display of menus, order entry, display of predicted preparation times, and payment via web-based browsers executing on the computers 112 and smart devices. A further embodiment envisages 3rd-party application programs executing on the computers 112 and smart devices 113 that communicate with the backend server 101 via one or more application programming interfaces (API's) and that communicate with delivery services such as, UberEats, DoorDash, GrubHub, Postmates, and the like, where the delivery services may communicate preparation/pickup times to their drivers 114.

As described above, the system 100 according to the present invention is employed by subscriber restaurants to perform the functions of displaying of menus, ordering of menu items by guests, upselling of menu items to guests, routing of ordered items to kitchen staff for preparation, sequencing of ordering items through kitchens, capture and historical tracking of metadata corresponding to each order, acceptance of payments by guests and processing of those payments through corresponding credit card networks and financial institutions, and payment of charged amounts to the restaurants themselves, where the backend server 101 directs the terminals 121, 123, 124 via messaging to execute one or more of these functions, and where the backend server 101 also synchronizes all of the terminals 121, 123, 124 within a restaurant 120 so that they reflect the current status and state of all orders in process within the restaurant, and where the backend server 101 accesses the subscriber menus database 106 to configure all of the terminals 121, 123, 124 with current menu items for the restaurant 120, and where the backend server 101 stores all metadata received from the kitchen fulfillment terminals 124 and the other data database 111 that is associated with orders fulfilled within the restaurant in the historical subscriber fulfillment database 107. As alluded to earlier, though these functions are essential to efficient operation of the subscriber restaurants, the present disclosure focuses on an area of significant importance to restaurant management: accurate prediction of order preparation times.

As one skilled in the art will appreciate, especially during seasons (e.g., pandemics) when more orders are placed for pickup or delivery that are placed by diners within, loyalty to a particular restaurant rests upon the accuracy of preparation times predictions. One skilled in the art will further appreciate that most diners do not relish sitting and waiting for a meal order to be prepared that was promised, say, a half hour earlier. These diners likewise abhor cold food that was prepared a half hour prior to the time it was promised. In a 3rd-party delivery service scenario, where preparation time estimates are further muddled as a result of the additional layer of service complexity, the drivers 114 feel the full force of dissatisfied diners' ire, when is then attributed to the quality of the 3rd-party delivery service. Notwithstanding that 3rd-party delivery service logistics play a substantial role in missed timing of deliveries to guests, the predictions of preparation times provided by the restaurants 120 to the delivery services also contribute to the problem. Stated more simply, inaccurate order ready time predictions by restaurants 120 are infuriating to guests picking up orders; to those guests having their orders delivered by a delivery service driver 114, inaccurate order pickup times provided by the restaurants 120 to the delivery service only further annoy their guests.

Therefore, it is an object of the present invention to enable the prediction of order preparation times, order pickup times, and order ready times more accurately than that which has heretofore been provided. Accordingly, to clearly teach relevant aspects of the present invention, only those elements 102-107 that are required to achieve this objective are depicted within the backend server 101 of FIG. 1. More specifically, the preparation time predictor 102 updates order preparation/ready/pickup times for all of the orders within all of the subscriber restaurants 120 in near-real time based upon historical and actual preparation times for individual items in the orders, historical and actual preparation times for the orders themselves, and dynamically changing metadata (as described above) corresponding to the orders. In one embodiment, the preparation time predictor 102 update order preparation/ready/pickup times for all of the orders within all of the subscriber restaurants 120 every 2 seconds. Another embodiment contemplates update of the times every 1 second. Other update intervals may be configured to comport with strategic operational objectives for a given restaurant 120. In one embodiment, individual restaurants 120 may select from several update intervals based upon business objectives. If particular orders have been placed for pickup by guests using a computer 112 or smart device 113, when the preparation time predictor 102 detects a change to corresponding pickup times it directs the dispatch controller 104 to transmit a message via COMMS 103 to be delivered to the computer 112 or smart device 113 that causes the computer 112 or smart device 113 to alert the guests of the updated pickup times. If certain orders have been placed for by guests using a computer 112 or smart device 113 for delivery by a delivery service, when the preparation time predictor 102 detects a change to corresponding pickup times it directs the dispatch controller 104 to transmit a message via COMMS 103 to be delivered to the delivery service that informs the delivery service of the updated pickup times so that the delivery service can update their drivers 114.

Other embodiments of the present invention contemplate the use of digital menus within one or more of the restaurants 120 that may be displayed and updated on one or more of the POS terminals 121, 123 and also within proprietary applications executing on the guest devices 112, 113, where the digital menus, in addition to providing descriptions and cost of each menu item within the one or more of the restaurants 120, also provide predictions of preparation times for each of the menu items, where the preparation times for each of the menu items are predicted and frequently updated by the preparation time predictor 102 and are communicated via messages over the internet 110 to the one or more of the restaurants 120 that direct the one or more of the POS terminals 121, 123 and guest devices 112, 113 to update predicted preparation times. Advantageously, such digital menus enable guests to make more informed decisions when ordering according to the time available to the guests for pickup, delivery, and/or in-restaurant dining.

Figure 2:
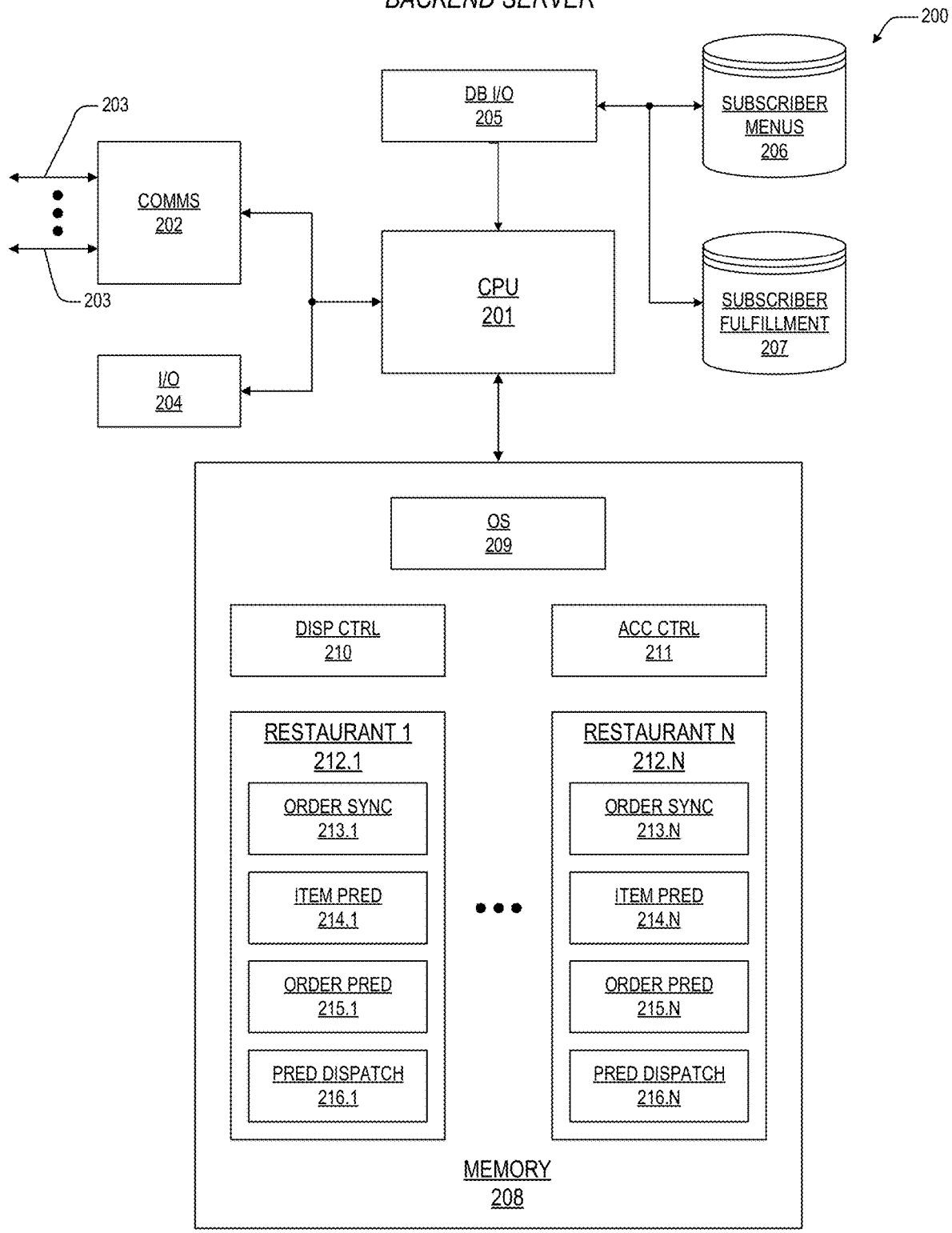
FIG. 2 is a block diagram depicting a backend server according to the present invention, such as may be employed in the order preparation times prediction system of FIG. 1.

Referring to FIG. 2, a block diagram is presented depicting a backend server 200 according to the present invention, such as may be employed in the order preparation times prediction system 100 of FIG. 1. In various embodiments, the backend server 200 may comprise a central processing unit (CPU) 201 that is coupled to a memory 208 having both transitory and non-transitory memory components therein. The CPU 201 is also coupled to a communications circuit 202 that couples the backend server 200 to the Internet 110 via one or more wired and/or wireless links 203 as are discussed above. The backend server 200 may also comprise input/output circuits 204 that include, but are not limited to, data entry and display devices (e.g., keyboards, monitors, touchpads, etc.), where the input/output circuits 204 are coupled to the communications circuit 202 and the CPU 201. The CPU 201 is also coupled to database input/output circuits 205. The database input/output circuits 205 are coupled to a subscriber menus database 206 and a subscriber fulfillment database 207. In one embodiment, the subscriber menus database 206 and subscriber fulfillment database 207 are disposed in the same location as the backend server 200. In another embodiment, the subscriber menus database 206 and subscriber fulfillment database 207 are not disposed in the same location as the server 200 and are accessed via messages transmitted and received over the links 203 rather than by direct connection as shown in the diagram.

The memory 208 may include an operating system 209 such as, but not limited to, Microsoft Windows, Mac OS, Unix, and Linux, where the operating system 209 is configured to manage execution by the CPU 201 of program instructions that are components of one or more application programs. In one embodiment, a single application program comprises a plurality of modules (or "code segments") 210-211, 212.1-212.N, 213.1-213.N, 214.1-214.N, 215.1-215.N, 216.1-216.N resident in the memory 208 and identified as a display control segment (DISP CTRL) 210, a database access control segment (ACC CTRL) 211 and a plurality of restaurant segments 212.1-212.N, each corresponding to one of the subscriber restaurants 120. Each of the plurality of restaurant segments 212.1-212.N includes a corresponding order synchronization segment (ORDER SYNC) 213.1-213.N, a menu item-level preparation time prediction segment (ITEM PRED) 214.1-214.N, an order-level preparation time prediction segment (ORDER PRED) 215.1-215.N, and a prediction times dispatch segment (PRED DISPATCH) 216.1-216.N

Operationally, the backend server 200 may execute one or more of the code segments 210-211, 212.1-212.N, 213.1-213.N, 214.1-214.N, 215.1-215.N, 216.1-216.N as required perform the functions disclosed above with reference to FIG. 1 to provide for menu display, order entry, order fulfillment, payment, order preparation times prediction, dispatch of updated predicted order preparation times, update of subscriber menus within the subscriber menus database 206 when they are changed, and update of records within the subscriber fulfillment database 207 to store order fulfilment data and metadata as is disclosed above. DISP CTRL 210 may execute to generate content for display by subscriber terminals 121, 123, 124, which is transmitted via COMMS 202. ACC CTRL 211 may execute anytime access is required by other segments to the subscriber menus database 206 or the subscriber fulfillment database 207 to create new records in the databases 206-207, to read records stored in the databases 206-207, and to update existing records stored in the databases 206-207.

All of the like named segments within each of the restaurant segments 212.1-212.N operate is substantially the same manner to communicate with and control terminals 121, 123, 124 within each of the subscriber restaurants. The restaurant segments 212.1-212.N may be configured differently to accommodate different numbers and configurations of terminals 121, 123, 124, different menus, different kitchen conditions, different locations and external influencing factors, and different options for predicting order preparation times. Though configured differently, the restaurant segments 212.1-212.N are configured to perform the same functions for each of their corresponding restaurants and, thus, it is sufficient to describe operation of a single restaurant segment 212.1. ORDER SYNC 213.1 may execute to receive new orders from restaurant 1 120 that are entered via one or more corresponding terminals 121, 123, to direct one or more kitchen fulfillment terminals 124 therein to perform sequencing and coursing of the new orders, to synchronize states and status of all orders in restaurant 1 with all terminals 121, 123, 124 therein, to accept and process payment for the new orders, to close out orders when payment is received/authorized, to receive all order data and metadata corresponding to the completed orders from the kitchen fulfillment terminals 124, to access the other data database 111 to obtain metadata for the completed orders that is not provided by the kitchen fulfillment terminals 124, and to direct the database I/O circuit 205 to update records for restaurant 1 in the subscriber fulfillment database 207 with the received order data, kitchen fulfillment metadata, and other order metadata to provide a ground truth set of data that may be subsequently employed for prediction of menu item-level and order-level preparation times.

ITEM PRED 214.1 may be executed periodically to generate preparation time predictions for each of the menu items in a menu corresponding to restaurant 1. In one embodiment, ITEM PRED 214.1 is executed every two weeks. Another embodiment contemplates execution of ITEM PRED 214.1 monthly. A further embodiment contemplates execution of ITEM PRED 214.1 upon any change in menu items within the menu. When executed, ITEM PRED 214.1 generates preparation time predictions for every menu item in the menu corresponding to restaurant 1, as will be described in further detail below. These item-level preparation time predictions are stored in the subscriber fulfillment database 207 in records corresponding to restaurant 1.

ORDER PRED 215.1 may be executed in near real time, as noted above with reference to FIG. 1, for all current orders in restaurant 1 to continuously generate order-level preparation time predictions for the current orders. In one embodiment, only current orders are considered. In a digital menu embodiment, as discussed above, ORDER PRED 215.1 may be executed in near real time to additionally generate preparation time predictions for each item in restaurant 1's menu. These preparation time predictions are transmitted by the backend server via COMMS 202 to the terminals 121, 123, 124 for use by staff and for optional display to guests (in a digital menu scenario). For pickup and delivery orders, PRED DISPATCH 216.1 may execute to provide initial predicted order preparation times and updated predicted order preparation times via COMMS 202 so that they may be delivered to corresponding laptop/desktop computers 112, smart devices 113, and delivery services that in turn notify delivery drivers 114.

The backend server 101, 200 according to the present invention is configured to perform the functions and operations as discussed above. The backend server 101, 200 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the backend server 101, 200 may be shared with other circuits, microcode, etc., that are employed to perform other functions and/or operations within the backend server 101, 200. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 3:
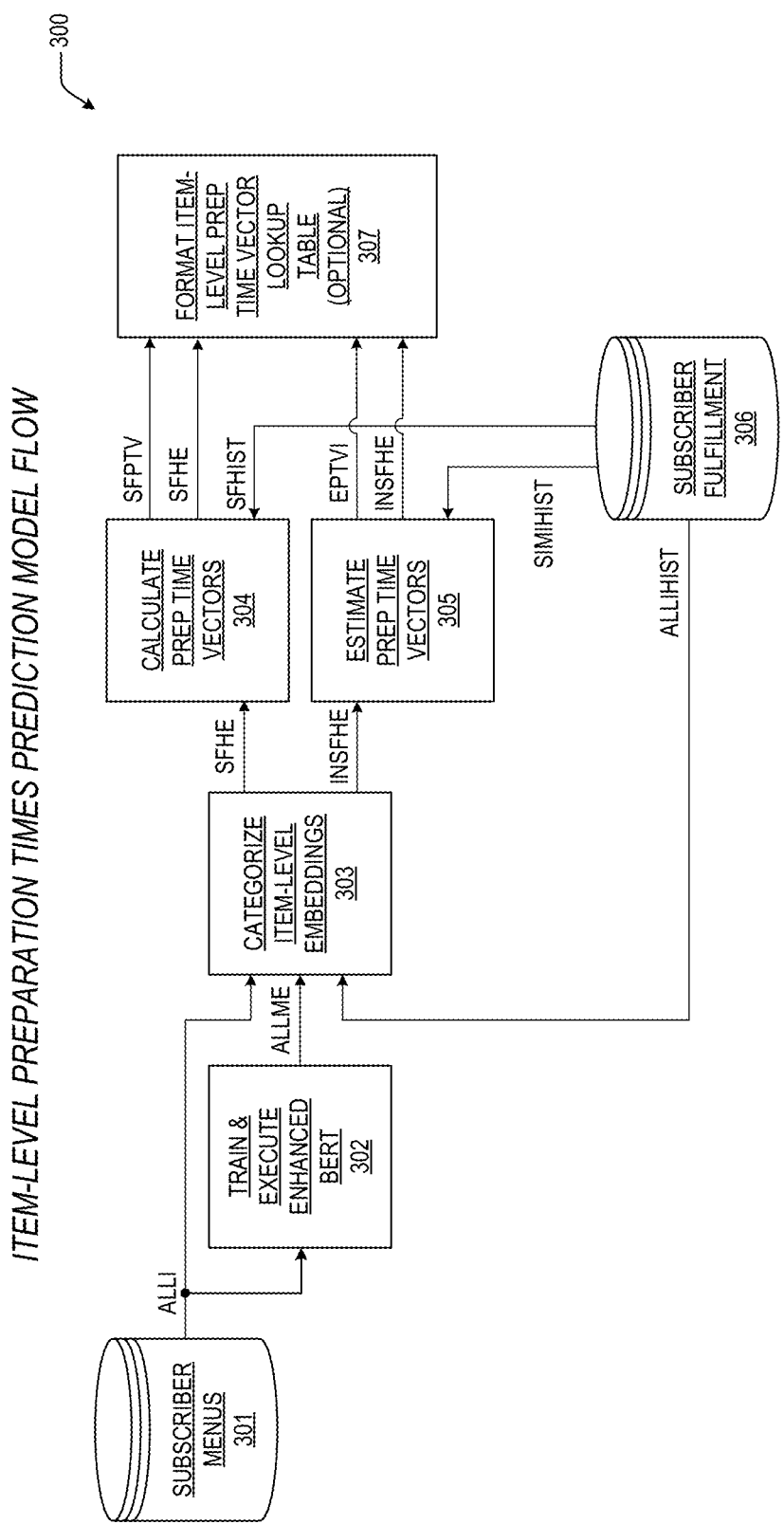
FIG. 3 is a flow diagram featuring steps for predicting item-level preparation times using a menu item-level preparation time prediction model according to the present invention.

Now turning to FIG. 3, a flow diagram is presented featuring steps for predicting item-level preparation times using a menu item-level preparation time prediction model according to the present invention, such as may be embodied by one of the ITEM PRED code segments 214.1-214.N of FIG. 2. The present inventors note that the limitations of present-day techniques for predicting order-level preparation times are overcome according to the present invention by virtue of the vast amount of historical ground truth data that is stored in the subscriber fulfillment database 107, 207 that reflects the actual amount of time that it has taken, over a selected interval of months, to prepare individual items on a given menu. And for those menu items without sufficient historical preparation time data, the menu item-level preparation times prediction model according to the present invention is configured to leverage this vast amount of historical ground truth data for similar items within the same restaurant or corresponding to other subscriber restaurants 120 in order to generate a very accurate item-level preparation time predictions for those menu items. More simply stated, and as will be discussed in more detail below, if a given restaurant has sufficient historical preparation time data stored in the subscriber fulfillment database 107, 207 for a given item, say, a cheeseburger, then the sufficient historical preparation time data is employed by the model to generate a predicted item-level preparation time for the cheeseburger. If there is insufficient historical preparation time data stored in the subscriber fulfillment database 107, 207 for a different item, say a relatively new menu item named, "Black Peppercorn Soaked Buffalo Tenderloin on Jalapeno Grits, Field of Greens, and Yellow Squash Mini Taco with Adobo Chili Sauce," then the item-level preparation times prediction model according to the present invention is configured to employ deep learning techniques to 1) determine menu items which have sufficient historical preparation time data from the other restaurant's menus that are closest in similarity to the different item and 2) generate a predicted preparation time for each of similar items using their corresponding historical actual preparation time data, and 3) generate a predicted preparation time for the different item that is a weighted average of the similar preparation times, where the weights are determined based on the level of similarity.

First, all items from menus corresponding to all of the restaurants 120 within the subscription system are retrieved via bus ALLI from a subscriber menus database 301, the same as the databases 107, 207 of FIGS. 1 and 2. At block 302, an enhanced Bidirectional Encoder Representations from Transformers (BERT) model is trained using all of the menu items provided via ALLI as inputs to generate a vector representations (also known as "embeddings") of the menu items, which are provided as outputs via bus ALLME. As one skilled in the art will appreciate, BERT is a transformer-based machine learning technique for natural language processing pre-training, which was developed by Google. As one skilled in the art will also appreciate, BERT is a type of WORD2VEC model and is pre-trained deep learning model that is better suited to short strings and is that takes into account word sequence. Thus, because most restaurant menu items fall into the category of short strings having meaningful word sequences, the present inventors note that BERT is better suited for generation of vector representations of the menu items; however, any type of EMBEDDINGS model may be employed.

BERT is a deep learning model that has been pre-trained on Wikipedia and BooksCorpus and has achieved state-of-the-art results on a wide variety of natural language processing tasks, but as one skilled in the art will appreciate, task-specific fine-tuning is required. Advantageously, BERT generates embeddings that enable more than one representation for the same word depending on the context in which that word is used, whereas traditional word embedding models such as word2vec and GloVe are context independent where a generated embedding is fixed. For instance, the word "pie" can mean a whole pizza (as in a "pizza pie") or it can mean a baked pastry. Word2vec would generate the same vector representation for the word "pie" in both of these cases, while BERT generates two different embeddings for the word "pie," because the word is used in two different contexts. Consequently, the item-level deep learning model according to the present invention produces embeddings that are superior for use when compared to embeddings obtained from traditional embedding models, because the BERT model performs better on short strings and further takes into account word sequence.

Accordingly, the enhanced BERT word embedding model is trained on the menu item texts provided via ALLI. BERT produces embeddings just like word embedding models like word2vec and GloVe, but the mechanism of how that is done is different. More specifically, Word2vec looks at each and every word in a menu item text and determines which words most frequently co-appear with a given word. However, BERT takes in as input the entire sequence of words/tokens (i.e., sentences/phrases/menu item text) and produces an embedding for the entire sequence/menu item directly, unlike in word2vec where it is required to first produce an embedding for an individual word/token in a sequence/menu item and then average the embeddings for all words in the sequence to get the embedding of the sequence/menu item. Once the model has determined an embedding vector for each of the menu items, individual embeddings for words in multiple word menu items are averaged to generate menu items embeddings. Because BERT is pre-trained on hundreds of millions of words, the item-level preparation times prediction model according to the present invention employs "transfer learning" on BERT to "fine-tune" a BERT embedding for each menu item provided by ALLI. Accordingly, the output vectors provided on ALLME are menu item embeddings, each corresponding to one of the menu items within the subscriber menus database 301.

At block 303, each of the menu item-level embeddings is categorized as having sufficient historical preparation time data or insufficient historical preparation time data. Historical preparation times for each of the menu items provided on bus ALLI are accessed from the subscriber fulfillment database 306, which is the same as the subscriber fulfillment databases 107, 207 of FIGS. 1 and 2, respectively. In one embodiment, when actual preparation times have been captured for more than half of the period of time used by the model, then it is deemed that there is sufficient historical data available; when actual preparation times have been captured for less than half of the period of time used by the model, then it is deemed that there is insufficient historical data available. Thus, the item-level embeddings are categorized as having sufficient historical preparation time data or having insufficient historical preparation time data. Preferably, the item-level model according to the present invention contemplates a period of one year immediately prior to prediction time where historical actual preparation times are employed to generated corresponding item-level preparation time predictions, where six months demarcates the difference between sufficient and insufficient captured preparation times. Though one year is preferred, the present inventors note that reasonably accurate predictions can be made using just two months of historical data. Menu item embeddings with sufficient historical preparation time data are presented on bus SFI and those without sufficient historical preparation time data are presented on bus INSFI.

At block 304, each of the menu item embeddings having sufficient historical data is processed to generate corresponding item-level preparation time vectors. Historical preparation times for the period of model interest (e.g., 1 year immediately prior) are accessed via bus SFHIST from the subscriber fulfillment database 306 for each of the menu item embeddings and, in one embodiment, corresponding 4×1 item preparation time vectors are calculated. Each of the item preparation time vectors have elements comprising 1) mean of all retrieved historical preparation times for the menu item of interest, 2) standard deviation of all retrieved historical preparation times for the menu item of interest, 3) $20^{th}$ percentile of all retrieved historical preparation times for the menu item of interest, and 4) $80^{th}$ percentile of all retrieved historical preparation times for the menu item of interest. The calculated menu item-level preparation time vectors are presented on bus SFPTV along with their corresponding menu item embeddings on bus SFHE.

At block 305, each of the menu item embeddings having insufficient historical data is processed to generate corresponding item-level estimated preparation time vectors, as follows:

For each menu item embedding having insufficient historical preparation time data, employ cosine similarity between the menu item embedding of interest and each of the menu item embeddings having sufficient historical preparation time data to generate similarity metrics that quantify the similarity of the menu item embedding of interest to each of the menu item embeddings having sufficient historical preparation time data;

Rank the similarity metrics in order from most similar to least similar;

Select the N most similar menu item embeddings having sufficient historical preparation time data;

Access historical preparation times for the period of model interest (e.g., 1 year immediately prior) for each of the N most similar menu item embeddings via bus SIMIHIST from the subscriber fulfillment database 306 and, in one embodiment, calculate corresponding 4×1 item preparation time vectors that have elements comprising 1) mean of all retrieved historical preparation times for the most similar menu item embedding of interest, 2) standard deviation of all retrieved historical preparation times for the most similar menu item embedding of interest, 3) $20^{th}$ percentile of all retrieved historical preparation times for the most similar menu item embedding of interest, and 4) $80^{th}$ percentile of all retrieved historical preparation times for the most similar menu item embedding of interest; and Compute a weighted average of each of the elements within the N most similar menu item embeddings, where the weights are the cosine similarity metrics, to generate the corresponding item-level estimated preparation time vector for the menu item embedding.

In one embodiment, the N most similar menu item embeddings comprise the 10 most similar menu item embeddings, though other values of N are contemplated. The menu item-level estimated preparation time vectors are presented on bus EPTVI along with their corresponding menu item embeddings on bus INSFHE.

At block 307, each of the preparation time vectors along with their corresponding menu item-level embeddings may be optionally formatted into a lookup table that is stored in the memory 208 for subsequent access when predicting order-level preparation times. The present inventors note that a lookup table is preferred to reduce latency when predicting order-level preparation times, since menu items changes infrequently when compared to dynamic kitchen conditions; however, the flow of FIG. 3 may be executed under certain conditions to generate dynamic menu item-level predictions for selected menu items that are included within a corresponding order.

Advantageously, the item-level preparation times prediction model according to the present invention enables extremely accurate item-level preparation time predictions since historical ground truth data is provided by restaurants 120 having kitchen fulfillment terminals 124, where this data is stored in the subscriber fulfillment database 107, 207, 306. Likewise, for menu items having insufficient historical preparation time data, extremely accurate item-level estimated preparation time predictions are enabled by leveraging the historical ground truth data is provided by restaurants 120 having kitchen fulfillment terminals 124 for similar menu items.

Figure 4:
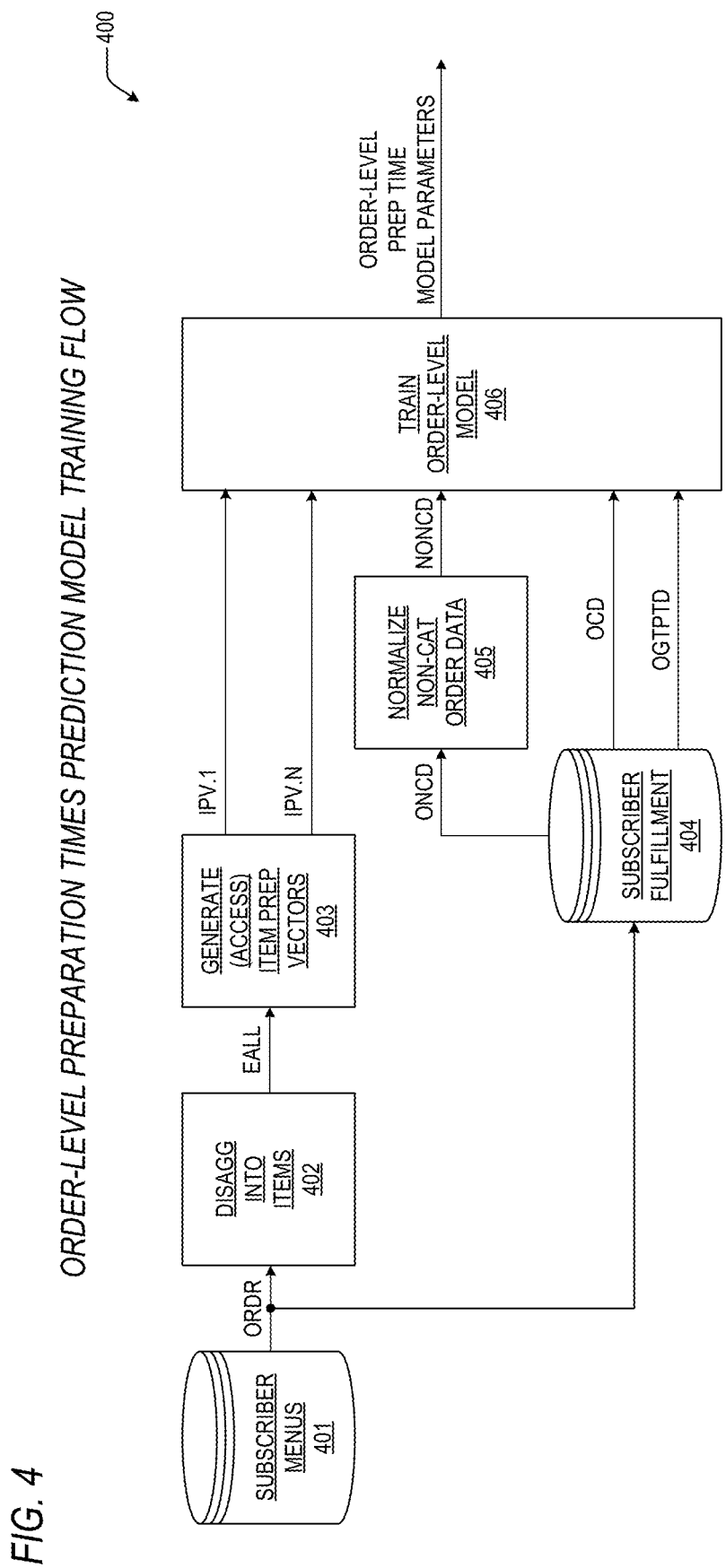
FIG. 4 is a flow diagram showing steps for training an order-level preparation time prediction model according to the present invention.

Now referring to FIG. 4, a flow diagram 400 is presented showing steps for training an order-level preparation times prediction model according to the present invention. Preferably the order-level preparation times prediction model comprises a deep learning neural network using item-level preparation time vectors described above with reference to FIG. 3 as input features when those items are included in an order along with order-level features internal to the kitchen and external to the kitchen, where order-level features internal to the kitchen are provided by one or more kitchen fulfillment terminal 124 and are stored in a subscriber fulfillment database 404, the same as subscriber fulfillment databases 107, 207, 306, and where the order-level features external to the kitchen are provided by the other data database 111 (at execution time) and are stored in the subscriber fulfillment database 404 (for use as training data). The order-level features according to the present invention may comprise:

Hour of the day, day of the week, and date of order;
Number of kitchen employees;
ID(s) of employees assigned for preparation of item(s) within the order;

Dining option for the order, i.e., dine-in, takeout, or delivery);

Number of items in order;

Total cost of order;

Short-term kitchen load (i.e., number of other orders that are currently being fulfilled divided by the number of orders that have been completed in the past X minutes, where the value of X is set to capture the short-term fluctuations of kitchen load, and where X preferably equals five minutes);

Number of pending orders resulting from online/$3^{rd}$-party orders, call in orders reservations, sat tables, etc.;

Kitchen status (e.g., meat temperature status, kitchen equipment status;

Concurrent internal events (e.g., large parties);

Concurrent external events (e.g., sporting events, concerts, road conditions, etc.); and Local weather conditions at time of order (e.g., temperature, precipitation, etc.

Advantageously, all of the above internal features are available for use by the order-level preparation time model according to the present invention because they are captures by the kitchen fulfillment terminals 124 at the time of fulfillment, thus giving the model full visibility of what's happening in a given kitchen at any time during order preparation. Thus, the order-level preparation times prediction model according to the present invention considers both the item-level preparation time features generated by the menu item-level preparation times prediction model of FIG. 3 along with the above listed order-level features.

To train the order-level preparation times prediction model, all possible menu item combinations are accessed from a subscriber menus database 401, like databases 106, 206, and 301 of FIGS. 1, 2, and 3, respectively. These combinations are provided on bus ORDR and are checked to determine if each of the combinations have sufficient historical (i.e., ground truth) fulfillment data, including preparation time. Menu item combinations lacking sufficient historical fulfillment data are not considered.

At block 402, each of the menu item combinations (i.e., orders) having sufficient historical fulfillment data are disaggregated into their individual menu items. For example, a "Taco Dinner" may be disaggregated into individual menu items of "3 Tacos," "1 Spanish Rice," and "1 Frijoles." The disaggregated menu items for the order combinations are provided on bus EALL.

At block 403, menu item preparation time vectors corresponding to the menu items for the order are either generated as is described above with reference to FIG. 3, or are preferably accessed from a lookup table linking the menu items to their corresponding embeddings, along with their corresponding menu item-level preparation time vectors (calculated or estimated). The item-level preparation time vectors for menu items within the order are presented on busses 1 PV.1-IPV.N, where N is the number of menu items in the order. As noted above, these vectors are employed as input features to the order-level preparation times deep learning model. At block 405, order-level features that are no categorical (e.g., number of items in order, total cost, etc.) are normalized to values between 0 and 1, and these normalized values are provided on bus NONCD. Categorical features (e.g., hour of day, day of week, dining option, etc.) are accessed from the subscriber fulfillment database 404 and are provided on bus OCD. In addition, the ground truth actual preparation time for the order of interest is extracted from the subscriber fulfillment database 404 and is provided on bus OGTPTD.

The steps of blocks 402-405 are performed for each order combination and occurrence of that order combination that is stored in the subscriber fulfillment database 404, and at block 406, the above noted features are employed to train the order-level preparation time model according to the present invention using the actual order preparation times provided on OGTBTD. Once trained, order-level preparation time model parameters (e.g., weights for each of the layers) are provided for use in executing the order-level preparation times model in near real time to predict order preparation times for current orders within any of the subscriber restaurants 120, using real time data provided by their corresponding kitchen fulfillment terminals 124 and the other data database 111. In one embodiment, the menu item-level preparation time vectors are passed through a max pooling layer where the maximum of all weighted averages of items in the order, maximum of all weighted standard deviations of items, maximum of all 20th percentiles, and maximum of all 80th percentiles are taken. As one skilled in the art will appreciate, max pooling reduces the spatial size of convolved features and also reduces over-fitting. Though a max pooling layer is used in a preferred embodiment, the present inventors note that this layer may be replaced with other similar pooling layers (e.g., average pooling). The output of the max pooling layer is still 4-dimensional, where each dimension now represents the max.

In one embodiment, normalized features are passed through two fully connected network layers (each with 400 units) having scaled exponential linear unit (SELU) activation functions, though the present inventors note that the SELU activation functions were chosen to achieve better convergence and accuracy based on the training data, and that the other functions (e.g., ELU, ReLU, LeakyReLU, etc.) may be employed in places of the SELU functions. The output is of the first two layers is 400 dimensional. Each of the categorical order-level features (e.g., such as hour of day, workday, dining option, etc.) is transformed into dense vector representations using an embedding layer of the order-level preparation times model, and the outputs of the embedding layer for each of the categorical order-level features are concatenated. For example, if the hour of day is 10 dimensional after it goes through the embedding layer and the dining option is 7 dimensional, then concatenation results in a 17-dimensional dense vector representation. In a preferred embodiment, the output of the concatenation results in 400 dimensions.

In the preferred embodiment, the 400-dimensional numerical order-level features, 400-dimensional categorical order-level features, and 4 dimensional item-level preparation time vector features are all concatenated to create 804-dimensional features. Those 804-dimensional features are passed through three fully connected layers of SELU (4096, 2048, and 1024 units respectively), and then to one output layer containing 1 neuron/unit, which represent a predicted order preparation time of the order.

The present inventors contemplate retraining the order-level preparation times model at an interval that captures significant changes to the order-level features, preferably monthly.

Figure 5:
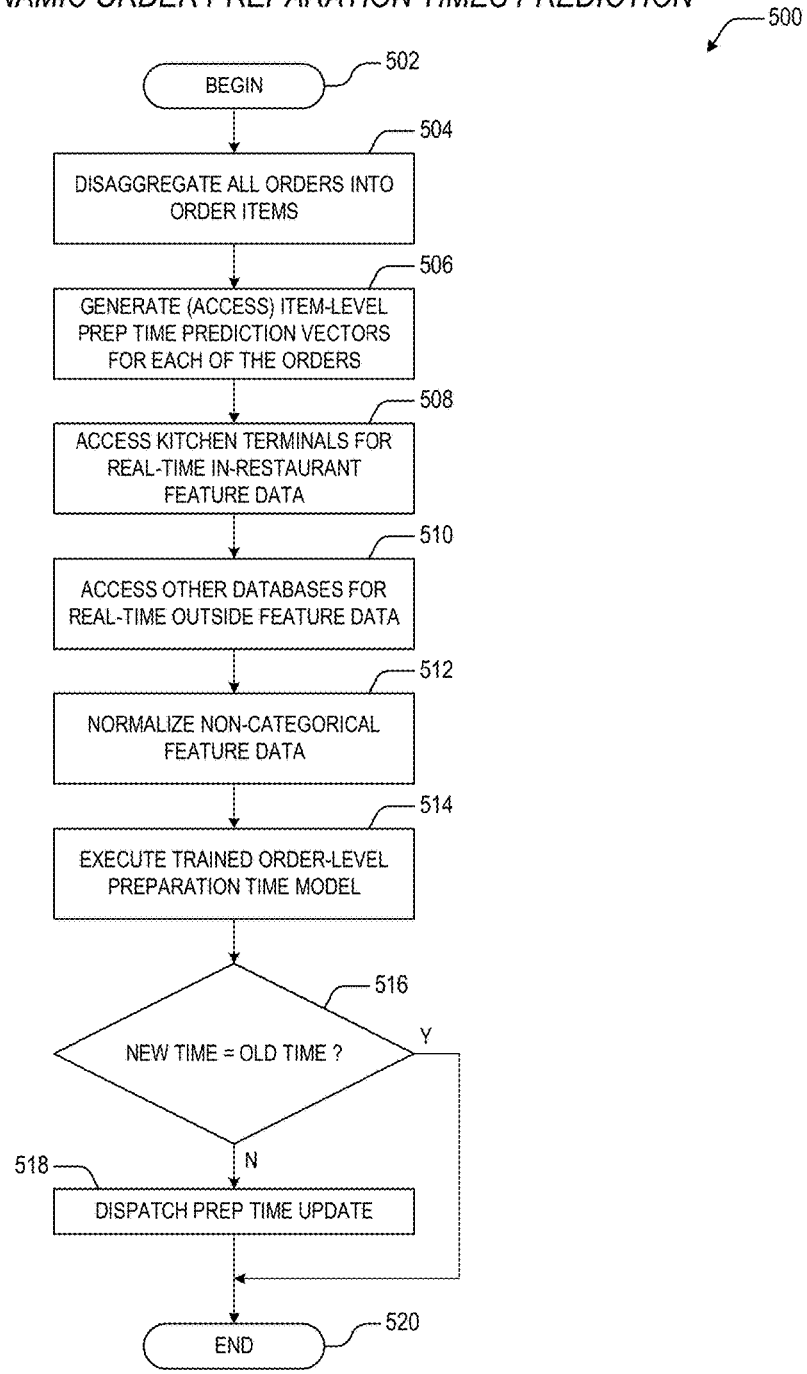
FIG. 5 is a flow diagram illustrating a method for dynamic order preparation time predictions according to the present invention.

Turning now to FIG. 5, a flow diagram 500 is presented illustrating a method for dynamic order preparation times prediction according to the present invention, such as may be employed by the preparation time predictor 102 within the background server 101 of FIG. 1. Flow begins at block 502, where it is desired to predict order preparation times for all orders in a restaurant 120 that have been placed for takeout, for delivery, or dine-in. Flow then proceeds to block 504.

At block 504, all of the orders of block 502 are disaggregated into their constituent menu items. Flow then proceeds to block 506.

At block 506 the preparation time predictor 102 accesses (or optionally generates) item-level preparation time prediction vectors for each of the items in each of the orders. Flow then proceeds to block 508.

At block 508, kitchen terminals 124 in the restaurant 120 are accessed to obtain real-time categorical and non-categorical metadata corresponding to the orders, as is disclosed above. Flow then proceeds to block 510.

At block 510, other databases 111 are accessed to obtain external features (e.g., weather, events, etc.) corresponding to the orders. Flow then proceeds to block 512.

At block 512, all non-categorical features are normalized as is described above with reference to FIG. 4. Flow then proceeds to block 514.

At block 514, the features corresponding to each of the orders are provided to a trained order-level preparation times model, as described above with reference to FIG. 4, to generate predicted order preparation times corresponding to each of the orders. Flow then proceeds to decision block 516.

At decision block 516, an evaluation is made for each of the current orders to determine if the predicted order-level preparation time is equal to a previously predicted order preparation time. If so, then flow proceeds to block 520. If not, then flow proceeds to block 518.

At block 518, the preparation time predictor 102 directs the dispatch controller 104 to transmit the new order-level preparation time via COMMS 103 to a receiving device (e.g., computer 112, tablet 113, delivery service, or fixed terminal 123 being employed as a digital menu), where icons and data on the receiving device may be manipulated to indicate the new order-level preparation time.

At block 520, the method completes.

In a preferred embodiment, steps 502 through 520 are repeated at an interval, approximately ranging from 1 to 10 seconds depending on server workload, that is sized to capture changing conditions (internal and external) related to the orders. In a digital menu embodiment, where one or more fixed terminals 123 within a restaurant are employed as digital menus that additionally display predicted preparation times, the steps 502 through 520 are executed for a prescribed portion of menu items. For example, a restaurant manager may choose to display predicted preparation times for entrees only, so preparation times for only those menu items will generated according to the period of prediction. In embodiments, where $3^{rd}$-party delivery services place orders on behalf of guests for delivery, other prescribed portions of menu items may be employed for order-level preparation times prediction and those preparation times or a range of preparation times for those other prescribed portions may be communicated to the $3^{rd}$-party delivery service.

The order-level preparation time prediction system 100 according to the present invention thus provides a superior technique for prediction order preparation times due to the vast amount of historical order- and item-level fulfillment data that is available for use, and additionally because restaurants 120 according to the present invention employ kitchen fulfillment terminal 124 that are capable of capturing dynamically changing kitchen conditions is real time.

Figure 6:
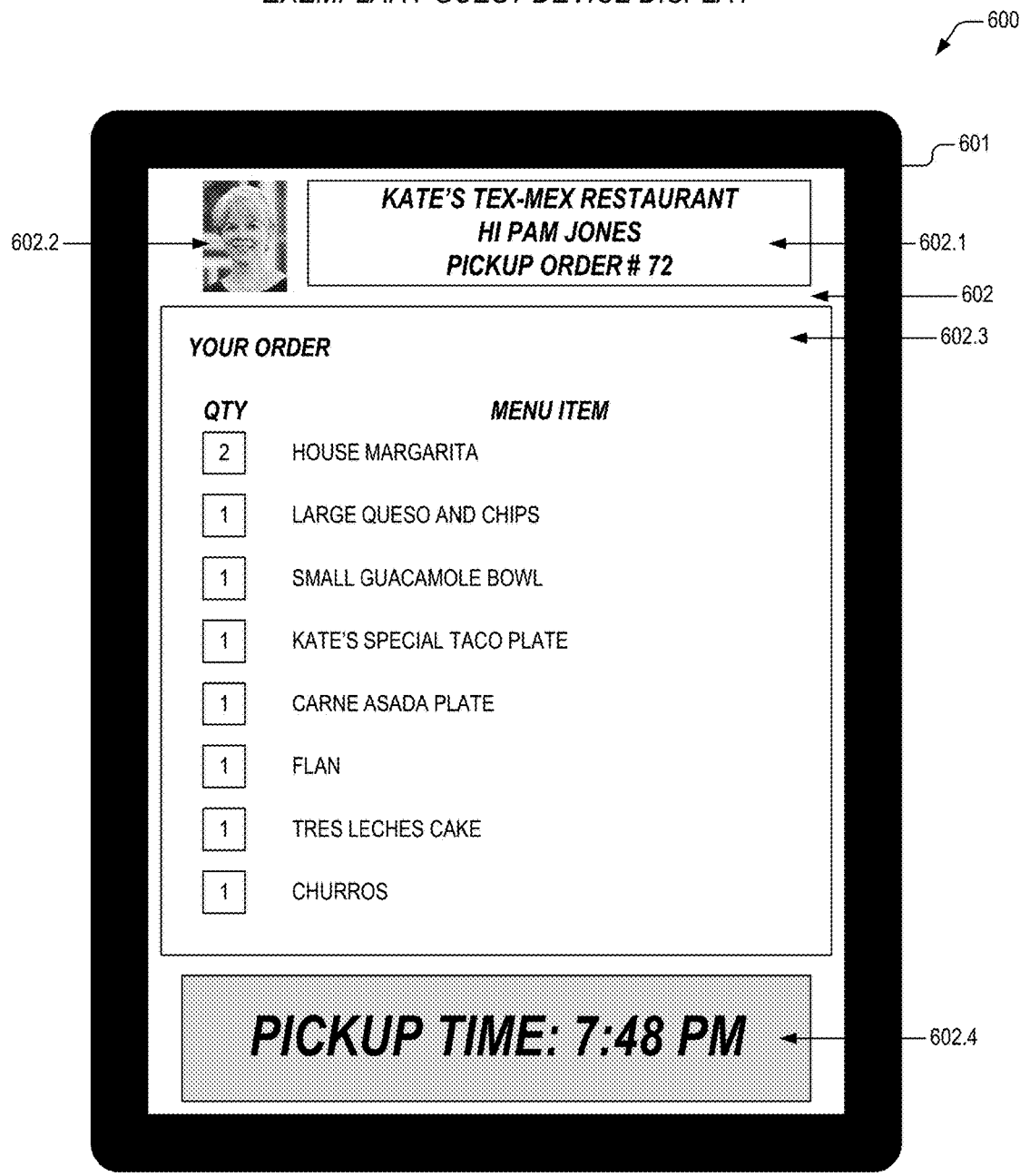
FIG. 6 is a diagram detailing an exemplary guest device according to the present invention.
Figure 7:
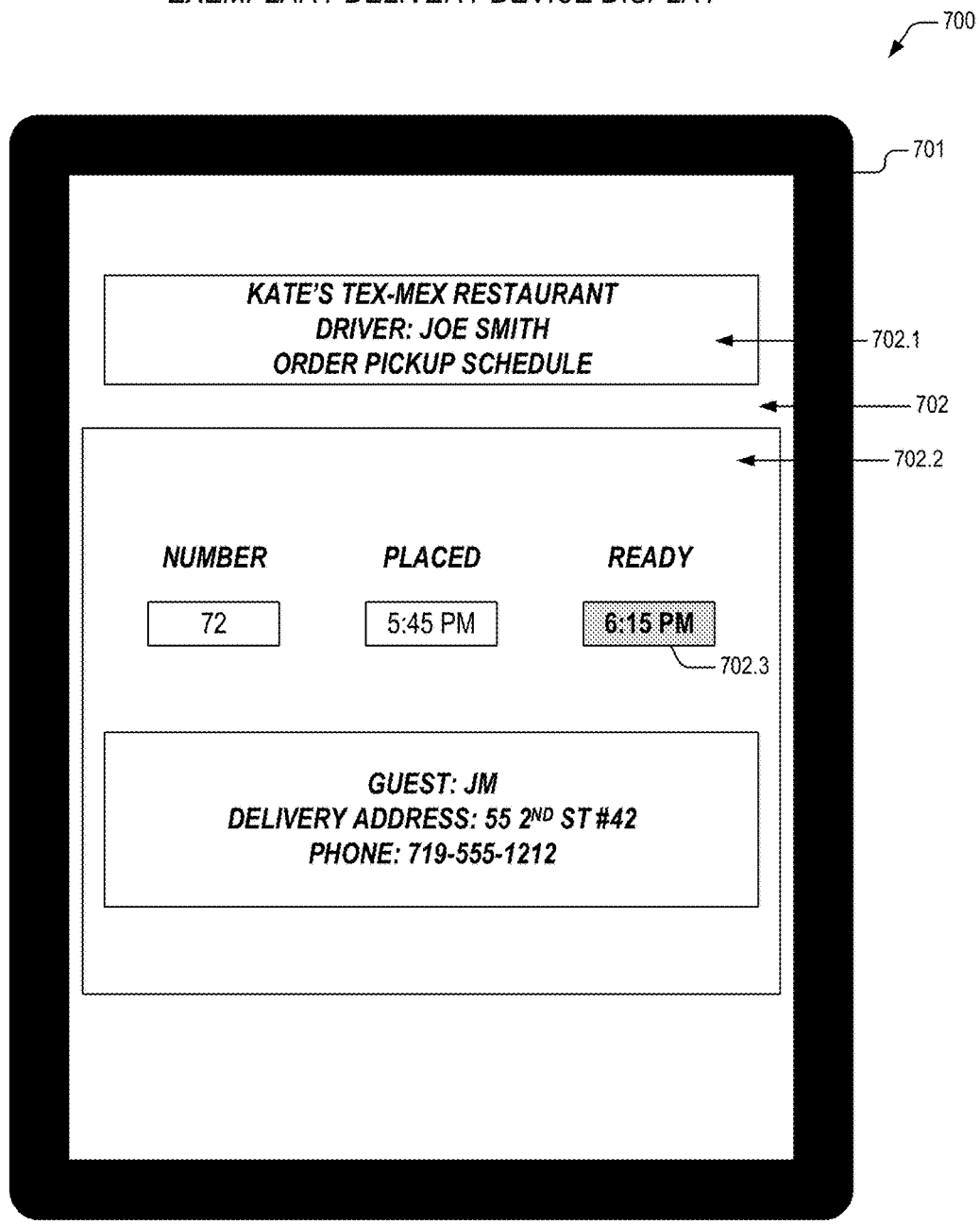
FIG. 7 is a diagram showing an exemplary delivery service device according to the present invention.
Figure 8:
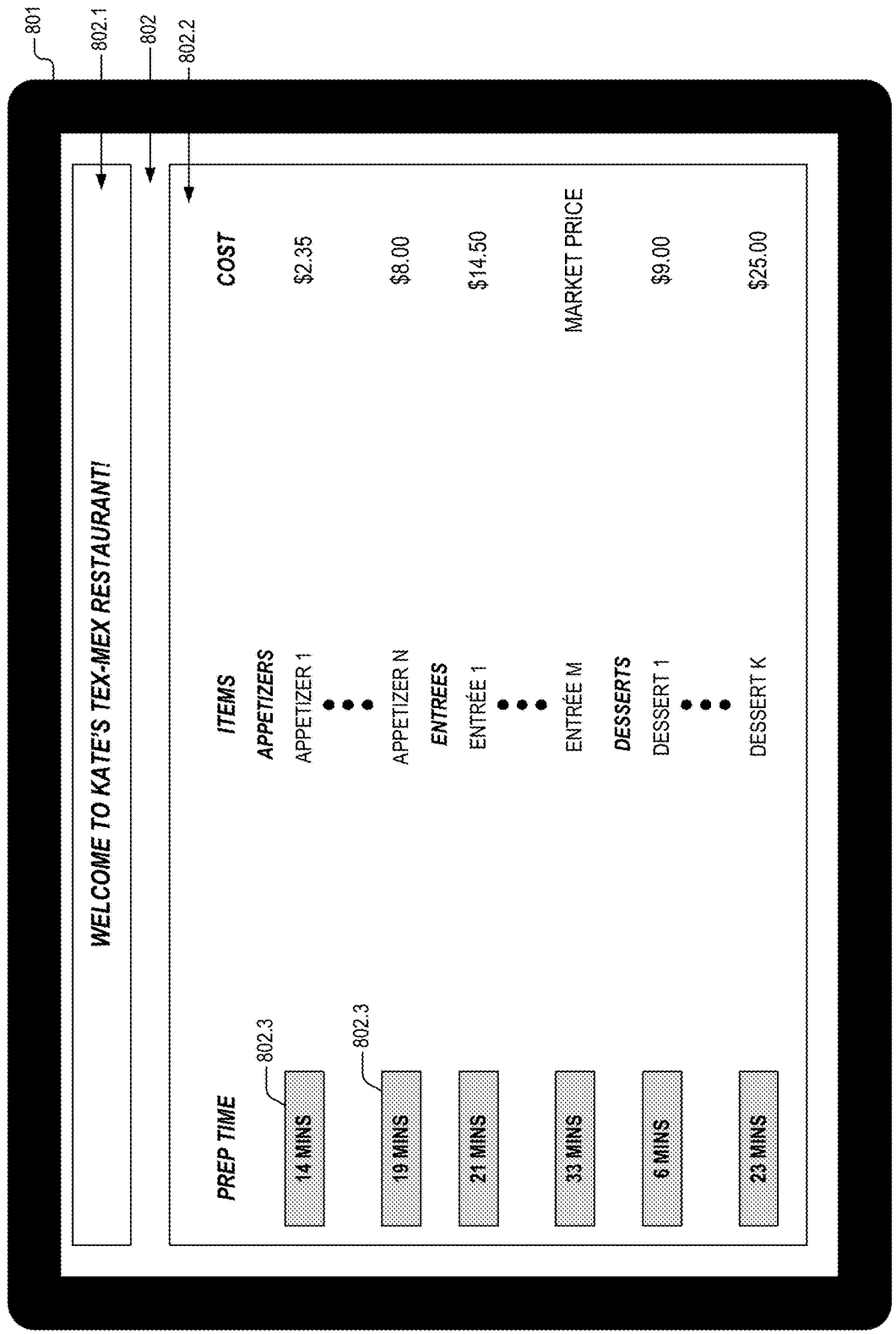
FIG. 8 is a diagram depicting an exemplary digital menu device having preparation times for menu items that are updated in accordance with execution of the order preparation time predictions model according to the present invention.

Having now described the order preparation time system 100 according to the present invention, attention is now directed to FIGS. 6-8 where exemplary displays on various receiving devices are discussed with regard to how icons and textual data may be manipulated responsive to the functions performed by the backend server 101 related to predicting and dispatching order-level preparation times.

Referring now to FIG. 6, a diagram 600 is presented detailing an exemplary guest device 601 according to the present invention, such as may be presented to a guest computer 112 or smart device 113 in the manner described above. The guest device 601 may comprise a display 602 that includes a restaurant identification area 602.1, a guest photo area 602.2, a placed order description area 602.3 and a pickup time area 602.4. As the diagram 600 shows, a guest identified as "PAM JONES" in area 602.1 and as shown in area 602.2 has placed order #72 and the order includes all of the items shown in area 602.3. As the preparation time predictor 102 executes to predict preparation times for current orders in a corresponding restaurant 120 ("KATE'S TEX-MEX RESTAURANT"), order preparation times are transmitted via the dispatch controller 104 over the internet 110 to the guest device 601, both initially, and when the predicted order preparation time changes. A pickup time icon in area 602.4 that corresponds to predicted order preparation times for order #72 is manipulated to indicate a most recently predicted pickup time ("7:48 PM"), thus enabling Ms. Jones to plan travel to the restaurant accordingly.

Turning to FIG. 7, a diagram is present showing an exemplary delivery service device 701 according to the present invention, such as may be presented to a delivery service computer 112 or delivery service smart device 113 in the manner described above. The delivery service device 701 may comprise a display 702 that includes a restaurant identification and driver identification area 702.1 and an order details area 702.2 that includes an order ready time icon 702.3. As the diagram 700 shows, a driver identified as "JOE SMITH" in area 602.1 has been dispatched by the delivery service to pick up order #72, which was placed by guest J M at 5:45 PM and which is to be delivered to the guest at the address shown. As the preparation time predictor 102 executes to predict preparation times for current orders in a corresponding restaurant 120 ("KATE'S TEX-MEX RESTAURANT"), order preparation times are transmitted via the dispatch controller 104 over the internet 110 to the delivery service device 601, both initially, and when the predicted order preparation time changes. The order ready time icon in area 702.3, which corresponds to predicted order preparation times for order #72,is manipulated to indicate a most recently predicted pickup time ("6:15 PM"), thus enabling Mr. Smith to plan travel to the restaurant 120 accordingly so that a timely delivery to guest J M may be perfected.

Finally referring to FIG. 8, a diagram 800 is presented depicting an exemplary digital menu device 801 having preparation times for menu items that are updated in accordance with execution of the order preparation times prediction model according to the present invention. As noted above, the digital menu device 801 may be one of the fixed terminals 124 within a restaurant that is employed to display the restaurant's menu items, their prices, and corresponding preparation times. The digital menu device 801 may comprise a display 802 that includes a restaurant identification and driver identification area 802.1 and digital menu area 802.2 that includes order preparation time icons 802.3 corresponding to each of a plurality of displayed menu items. As the diagram 800 shows, a plurality of preparation time icons 802.3 are shown indicating current preparation times for each the plurality of displayed menu items. As the preparation time predictor 102 executes to predict preparation times for current orders in a corresponding restaurant 120 ("KATE'S TEX-MEX RESTAURANT"), order preparation times are transmitted via the dispatch controller 104 over the internet 110 to the digital menu device 801, both initially, and when the predicted order preparation time changes. The order preparation times icon in area 802.3 are manipulated to indicate most recently predicted preparation times.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer program product, a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices. The devices may comprise one or more CPUs that are coupled to a computer-readable storage medium. Computer program instructions for these devices may be embodied in the computer-readable storage medium. When the instructions are executed by the one or more CPUs, they cause the devices to perform the above-noted functions, in addition to other functions.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A computer-implemented method for predicting order-level preparation times, the method comprising:

retrieving a historical set of item-level preparation time records from a database for preparation of all menu items corresponding to all restaurants participating in a point-of-sale (POS) subscriber system;

training and executing a first deep learning neural network to generate item-level embeddings for each of the menu items;

for a first subset of the historical set, calculating actual item-level preparation time vectors based on their corresponding historical item-level preparation time records;

for a second subset of the historical set, generating estimated item-level preparation time vectors based on historical item-level preparation time records for pluralities of menu items within the first subset, where each of the pluralities of menu items in the first subset comprise highest ranked item-level embeddings in the first subset that exhibit cosine similarities to corresponding item-level embeddings in the second subset, and wherein each of the estimated item-level preparation time vectors comprises a weighted average of the highest ranked item-level embeddings, the weighted average comprising a sum of all of the historical item-level preparation time records within the first subset corresponding to the highest ranked item-level embeddings weighted by corresponding cosine similarities;

retrieving a historical set of order-level preparation time records for preparation of orders from the database that corresponds to all restaurants participating in a point-of-sale (POS) subscriber system;

training a second deep learning neural network to predict the order-level preparation times, wherein inputs to the second deep learning neural network comprise one or more of the item-level preparation time vectors that correspond to menu items within each of the orders, ground truth actual preparation time for the each of the orders, and metadata taken from the order-level preparation time records that corresponds to the each of the orders, where non-categorical metadata is normalized to a value between 0 and 1, passed through 2 fully connected network layers to generate individual dense vector representations corresponding to each type of non-categorical metadata, the individual dense vector representations are concatenated to create concatenated dimensional features, and the concatenated dimensional features along with the item-level preparation time vectors and ground truth actual preparation times are passed through 3 fully connected network layers and one output layer to generate the order-level preparation times;

following training, executing the second deep learning neural network to generate predicted order-level preparation times for current orders within a restaurant, wherein inputs to the second deep learning neural network comprise one or more of the item-level preparation time vectors that correspond to menu items within each of the current orders, ground truth actual preparation for the each of the current orders, and metadata provided by one or more kitchen fulfillment terminals within the restaurant, wherein non-categorical metadata is normalized to a value between 0 and 1, passed through 2 fully connected network layers to generate individual dense vector representations corresponding to each type of non-categorical metadata, the individual dense vector representations are concatenated to create concatenated dimensional features, and the concatenated dimensional features along with the item-level preparation time vectors and ground truth actual preparation times are passed through 3 fully connected network layers and one output layer to generate the order-level preparation times;

subsequently executing the second deep learning neural network to generate updated predicted order-level preparation times for current orders within a restaurant;

translating one of the updated predicted order-level preparation times for a corresponding one of the current orders into an updated pickup time for the corresponding one of the current orders;

transmitting a message comprising the updated pickup time to a smart device associated with a guest, the guest having placed the corresponding one of the current orders; and manipulating one or more icons on a display of the smart device to indicate the updated pickup time.

2. The computer-implemented method as recited in claim 1, wherein the first deep learning neural network comprises an enhanced Bidirectional Encoder Representations from Transformers (BERT) model.

3. The computer-implemented method as recited in claim 1, wherein the metadata comprises short-term kitchen load.

4. The computer-implemented method as recited in claim 3, wherein the metadata further comprises total cost.

5. The computer-implemented method as recited in claim 4, wherein the metadata further comprises dining option.

6. The computer-implemented method as recited in claim 5, wherein the metadata further comprises hour of the day, day of the week, and date.

7. The computer-implemented method as recited in claim 1, wherein the executing the second deep learning neural network is performed every two seconds.

8. A non-transitory computer-readable storage medium storing instructions that, when executed by a computer, cause the computer to perform a method for predicting order-level preparation times, the method comprising:

retrieving a historical set of item-level preparation time records from a database for preparation of all menu items corresponding to all restaurants participating in a point-of-sale (POS) subscriber system;

training and executing a first deep learning neural network to generate item-level embeddings for each of the menu items;

for a first subset of the historical set, calculating actual item-level preparation time vectors based on their corresponding historical item-level preparation time records;

for a second subset of the historical set, generating estimated item-level preparation time vectors based on historical item-level preparation time records for pluralities of menu items within the first subset, where each of the pluralities of menu items in the first subset comprise highest ranked item-level embeddings in the first subset that exhibit cosine similarities to corresponding item-level embeddings in the second subset, and wherein each of the estimated item-level preparation time vectors comprises a weighted average of the highest ranked item-level embeddings, the weighted average comprising a sum of all of the historical item-level preparation time records within the first subset corresponding to the highest ranked item-level embeddings weighted by corresponding cosine similarities;

retrieving a historical set of order-level preparation time records for preparation of orders from the database that corresponds to all restaurants participating in a point-of-sale (POS) subscriber system;

training a second deep learning neural network to predict the order-level preparation times, wherein inputs to the second deep learning neural network comprise one or more of the item-level preparation time vectors that correspond to menu items within each of the orders, ground truth actual preparation time for the each of the orders, and metadata taken from the order-level preparation time records that corresponds to the each of the orders, wherein non-categorical metadata is normalized to a value between 0 and 1, passed through 2 fully connected network layers to generate individual dense vector representations corresponding to each type of non-categorical metadata, the individual dense vector representations are concatenated to create concatenated dimensional features, and the concatenated dimensional features along with the item-level preparation time vectors and ground truth actual preparation times are passed through 3 fully connected network layers and one output layer to generate the order-level preparation times;

following training, executing the second deep learning neural network to generate predicted order-level preparation times for current orders within a restaurant, wherein inputs to the second deep learning neural network comprise one or more of the item-level preparation time vectors that correspond to menu items within each of the current orders, ground truth actual preparation time for the each of the current orders, and metadata provided by one or more kitchen fulfillment terminals within the restaurant, wherein non-categorical metadata is normalized to a value between 0 and 1, passed through 2 fully connected network layers to generate individual dense vector representations corresponding to each type of non-categorical metadata, the individual dense vector representations are concatenated to create concatenated dimensional features, and the concatenated dimensional features along with the item-level preparation time vectors and ground truth actual preparation times are passed through 3 fully connected network layers and one output layer to generate the order-level preparation times;

subsequently executing the second deep learning neural network to generate updated predicted order-level preparation times for current orders within a restaurant;

translating one of the updated predicted order-level preparation times for a corresponding one of the current orders into an updated pickup time for the corresponding one of the current orders;

transmitting a message comprising the updated pickup time to a smart device associated with a guest, the guest having placed the corresponding one of the current orders; and manipulating one or more icons on a display of the smart device to indicate the updated pickup time.

9. The non-transitory computer-readable storage medium as recited in claim 8, wherein the first deep learning neural network comprises an enhanced Bidirectional Encoder Representations from Transformers (BERT) model.

10. The non-transitory computer-readable storage medium as recited in claim 8, wherein the metadata comprises short-term kitchen load.

11. The non-transitory computer-readable storage medium as recited in claim 10, wherein the metadata further comprises total cost.

12. The non-transitory computer-readable storage medium as recited in claim 11, wherein the metadata further comprises dining option.

13. The non-transitory computer-readable storage medium as recited in claim 12, wherein the metadata further comprises hour of the day, day of the week, and date.

14. The non-transitory computer-readable storage medium as recited in claim 8, wherein the executing the second deep learning neural network is performed every two seconds.

15. A computer program product for predicting order-level preparation times, the computer program product comprising:

a computer readable non-transitory medium having computer readable program code stored thereon, the computer readable program code comprising:

program instructions to retrieve a historical set of item-level preparation time records from a database for preparation of all menu items corresponding to all restaurants participating in a point-of-sale (POS) subscriber system;

program instructions to train and execute a first deep learning neural network to generate item-level embeddings for each of the menu items;

program instructions to, for a first subset of the historical set, calculate actual item-level preparation time vectors based on their corresponding historical item-level preparation time records;

program instructions to, for a second subset of the historical set, generate estimated item-level preparation time vectors based on historical item-level preparation time records for pluralities of menu items within the first subset, where each of the pluralities of menu items in the first subset comprise highest ranked item-level embeddings in the first subset that exhibit cosine similarities to corresponding item-level embeddings in the second subset, and wherein each of the estimated item-level preparation time vectors comprises a weighted average of the highest ranked item-level embeddings, the weighted average comprising a sum of all of the historical item-level preparation time records within the first subset corresponding to the highest ranked item-level embeddings weighted by corresponding cosine similarities;

program instructions to retrieve a historical set of order-level preparation time records for preparation of orders from the database that corresponds to all restaurants participating in a point-of-sale (POS) subscriber system;

program instructions to train a second deep learning neural network to predict the order-level preparation times, wherein inputs to the second deep learning neural network comprise one or more of the item-level preparation time vectors that correspond to menu items within each of the orders, ground truth actual preparation time for the each of the current orders, and metadata taken from the order-level preparation time records that corresponds to the each of the orders, wherein non-categorical metadata is normalized to a value between 0 and 1, passed through 2 fully connected network layers to generate individual dense vector representations corresponding to each type of non-categorical metadata, the individual dense vector representations are concatenated to create concatenated dimensional features, and the concatenated dimensional features along with the item-level preparation time vectors and ground truth actual preparation times are passed through 3 fully connected network layers and one output layer to generate the order-level preparation times;

program instructions to, following training, execute the second deep learning neural network to generate predicted order-level preparation times for current orders within a restaurant, wherein inputs to the second deep learning neural network comprise one or more of the item-level preparation time vectors that correspond to menu items within each of the current orders and metadata provided by one or more kitchen fulfillment terminals within the restaurant;

program instructions to subsequently execute the second deep learning neural network to generate updated predicted order-level preparation times for current orders within a restaurant;

program instructions to translate one of the updated predicted order-level preparation times for a corresponding one of the current orders into an updated pickup time for the corresponding one of the current orders;

program instructions to transmit a message comprising the updated pickup time to a smart device associated with a guest, the guest having placed the corresponding one of the current orders; and program instructions to manipulate one or more icons on a display of the smart device to indicate the updated pickup time.

16. The computer program product as recited in claim 15, wherein the first deep learning neural network comprises an enhanced Bidirectional Encoder Representations from Transformers (BERT) model.

17. The computer program product as recited in claim 15, wherein the metadata comprises short-term kitchen load.

18. The computer program product as recited in claim 17 wherein the metadata further comprises total cost.

19. The computer program product as recited in claim 18, wherein the metadata further comprises dining option.

20. The computer program product as recited in claim 19, wherein the metadata further comprises hour of the day, day of the week, and date.

* * * * *